United States Patent
Knauss et al.

(10) Patent No.: US 7,043,687 B2
(45) Date of Patent: May 9, 2006

(54) DOCUMENT/MESSAGE MANAGEMENT

(75) Inventors: Daniel E. Knauss, Troy, MI (US); Timothy A. Shear, Novi, MI (US); Prakash M. Reddy, Rochester Hills, MI (US); Srinivas Gadudasu, St. Clair Shores, MI (US); Srinivasan Sairamachandran, Troy, MI (US)

(73) Assignee: G. E. Information Services, Inc., Gaithersburg, MD (US)

( * ) Notice: Subject to any disclaimer, the term of this patent is extended or adjusted under 35 U.S.C. 154(b) by 553 days.

(21) Appl. No.: 10/024,051

(22) Filed: Dec. 21, 2001

(65) Prior Publication Data

US 2002/0083099 A1 Jun. 27, 2002

Related U.S. Application Data

(60) Provisional application No. 60/257,980, filed on Dec. 27, 2000.

(51) Int. Cl.
*G06F 15/00* (2006.01)

(52) U.S. Cl. .................... 715/513; 715/515; 715/523; 709/223

(58) Field of Classification Search ............. 715/513, 715/515, 523; 709/223
See application file for complete search history.

(56) References Cited

U.S. PATENT DOCUMENTS

| | | | |
|---|---|---|---|
| 5,557,780 A | 9/1996 | Edwards et al. | 395/500 |
| 6,226,675 B1 | 5/2001 | Meltzer et al. | 709/223 |
| 6,336,124 B1 | 1/2002 | Alam et al. | |
| 6,397,232 B1 | 5/2002 | Cheng-Hung et al. | |
| 6,418,400 B1 * | 7/2002 | Webber | 703/22 |
| 6,598,046 B1 * | 7/2003 | Goldberg et al. | 707/5 |
| 6,678,867 B1 | 1/2004 | Fong et al. | |
| 6,738,975 B1 * | 5/2004 | Yee et al. | 719/310 |
| 6,795,868 B1 * | 9/2004 | Dingman et al. | 709/246 |
| 6,871,331 B1 * | 3/2005 | Bloom et al. | 716/4 |
| 2002/0026461 A1 | 2/2002 | Kutay et al. | |
| 2002/0091974 A1 * | 7/2002 | Szydlowski | 714/699 |
| 2003/0135584 A1 * | 7/2003 | Roberts et al. | 709/218 |

* cited by examiner

*Primary Examiner*—Stephen Hong
*Assistant Examiner*—Kristina Honeycutt
(74) *Attorney, Agent, or Firm*—Foley & Lardner, LLP (57) ABSTRACT

A computer implemented method, apparatus and software for automatically transforming data between Electronic Data Interchange (EDI) formats. For generating EDI documents or messages, a source data model with EDI related data is received. Data is transferred from metadata elements of the source data model to variables of a virtual document, based on a mapping that has been previously made. Data assigned to the variables of the virtual document are then transferred to metadata elements of a target data model. An EDI document or message corresponding to the target data model is automatically created as a result, which includes data from the source document or message.

20 Claims, 9 Drawing Sheets

DOCUMENT/MESSAGE MANAGEMENT

RELATED APPLICATIONS

This application claims priority to U.S. provisional patent application Ser. No. 60/257,980, filed Dec. 27, 2000, which is incorporated in its entirety herein by reference.

FIELD OF INVENTION

This invention relates generally to the field of transferring data between formats and more particularly to a method, system and software for generating and receiving Electronic Data Interchange (EDI) documents or messages.

BACKGROUND OF THE INVENTION

In current business practice, there is a need for data transfer between companies, whether the data transfer is for a sale, an exchange, or any of the other various types of data transfers related to business transactions. The inventors of the present invention have determined that there is a need for a product or method that will allow an efficient transform of messages or documents between one company's internal system format to a common format, and then from the common format to another company's internal system format. That way, documents and messages can be readily transferred between companies.

EDI was developed to support business-to-business internal communication, and it has been around for approximately the last twentyfive years. However, EDI is also relevant for all company-to-supplier retailer relationships, where the company can be an end-user, a manufacturer, a service organization such as a hospital or a hotel, a governmental organization or a virtual organization.

EDI can be viewed as a set of messages developed for business-to-business communication of electronic data. It works by providing a collection of standard message formats and element dictionaries for businesses to exchange data via any electronic messaging service, and is characterized by standardized electronic formats for exchanging business data. Thus, EDI is conveniently used in electronic commerce for the exchange of documents between trading partners in a transaction.

Companies sending and/or receiving EDI data are required to ensure that they have tailored software programs that map between the two types of data, one being EDI data and the other being data in the company's internal system formats. Such mapping is a complex process that requires extensive resources and is time consuming. Also, changes in one document result in extensive changes to be made to other documents that utilize the document. Therefore, there is a need for more efficient tools to facilitate the mapping process, and to convert documents in one EDI format to documents in one or more other EDI formats.

Figure 1:
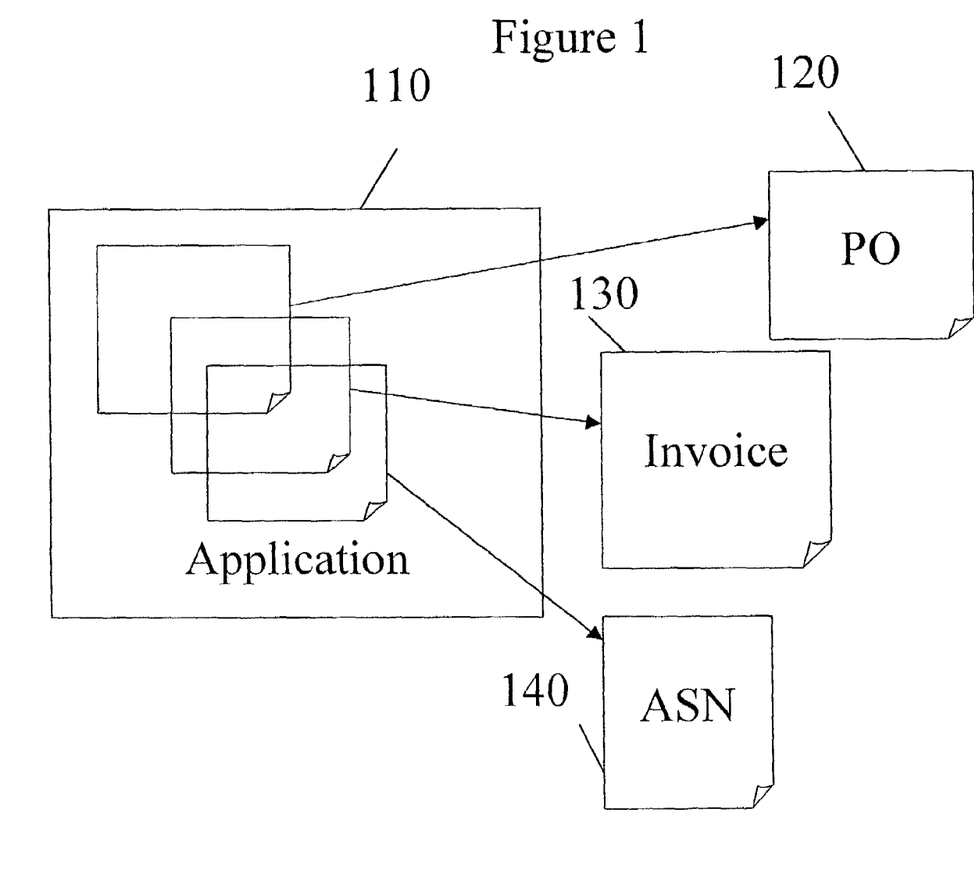
FIG. 1 is a block diagram showing a conventional EDI system that provides messages or documents from one or more applications.

FIG. 1 shows a conventional document management arrangement, in which a single application is linked to many documents or messages. Each document typically represents a type of transaction, such as an invoice or a purchase order or an advance shipping notice (ASN), and the application creates and/or modifies the documents or messages.

A single application, represented by box 110 in FIG. 1, is represented at run-time by an application message. In the example shown in FIG. 1, there are three different application messages that can be generated from the application 110, one being a Purchase Order (PO) application message 120, another being an Invoice application message 130, and yet another being an ASN application message 140. These are all application messages created from the same application, but they are different because the message or document to be created from the same application 110 is different. The result is a complex mapping of different application messages to documents or messages in a conventional EDI system. For example, three separate mappings are shown in FIG. 1, one for each application message of the single application 110.

There is also a problem with conventional EDI systems in that a change in the format of one document may result in changes to the formats of several other documents. This is because the EDI system represents documents in a manner associated with the EDI system, and a change in format of one document may be propagated across other documents via document representation mechanisms. Another situation in which this occurs is that of changing an application in a manner which causes document formats to be changed.

SUMMARY OF INVENTION

In one aspect of the present invention, there is provided a computer implemented method of automatically generating Electronic Data Interchange (EDI) documents or messages. The method includes receiving a source data model corresponding to EDI related data, the source data model including metadata, mapping the metadata of the source data model to corresponding variables of a virtual document, and mapping the variables of the virtual document to metadata of a target data model. With such mappings defined, when a source message or document is inputted to the EDI, the source message or document is translated to its corresponding metadata, and the values corresponding to the metadata are provided to the corresponding mapped variables of the virtual document at run time. The corresponding values of the mapped variables of the virtual document are then provided to the corresponding metadata of the target data model, in order to populate a target document or message with data from the source document or message. That way, an invoice or advance shipping notice to be output by a supplier in one EDI format, such as ANSI X12 standard, can be readily created from a purchase order provided by a purchaser in another EDI format, such as UN EDIFACT standard.

In another aspect of the present invention, the EDI formats correspond to, but are not limited to, an ANSI X12 standard, an UN EDIFACT standard, a TRADACOMS standard, a CIDX standard, and a ROSETTANET standard.

In yet another aspect of the present invention, the messages or documents processed by the EDI system of the present invention utilize a generated self-describing markup language such as extensible MarkUp Language (XML).

In another aspect of the present invention, a system is provided for automatically generating data in a self-describing markup language format from received EDI data, the system including a receiving unit that receives a message or document from a first trading partner as EDI data; a virtual document that maps metadata from the message or document of the first trading partner to variables of the virtual document, and that maps metadata from a message or document of a second trading partner to the variables of the virtual document; and a transmitting unit that transmits values provided to the variables of the virtual document from the message or document from the first trading partner, to the corresponding metadata of the message or document of the second trading partner.

In another aspect of the present invention, there is provided a computer readable data storage medium having program code recorded thereon that is executable by a computer for receiving a source data model corresponding to EDI related data, the source data model including metadata, mapping the metadata of the source data model to corresponding variables of a virtual document, and mapping the variables of the virtual document to metadata of a target data model. When a source message or document is received by the EDI system, the program code is programmed to translate the source message or document to its corresponding metadata, and to provide the values corresponding to the metadata to the corresponding mapped variables of the virtual document at run time. The program code is also programmed to provide the corresponding values of the mapped variables of the virtual document to the corresponding metadata of the target data model, and to populate a target document or message with data from the source document or message. That way, an invoice or advance shipping notice to be output by a supplier in one EDI format, such as ANSI X12 standard, can be readily created from a purchase order provided by a purchaser in another EDI format, such as UN EDIFACT standard.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

Figure 2:
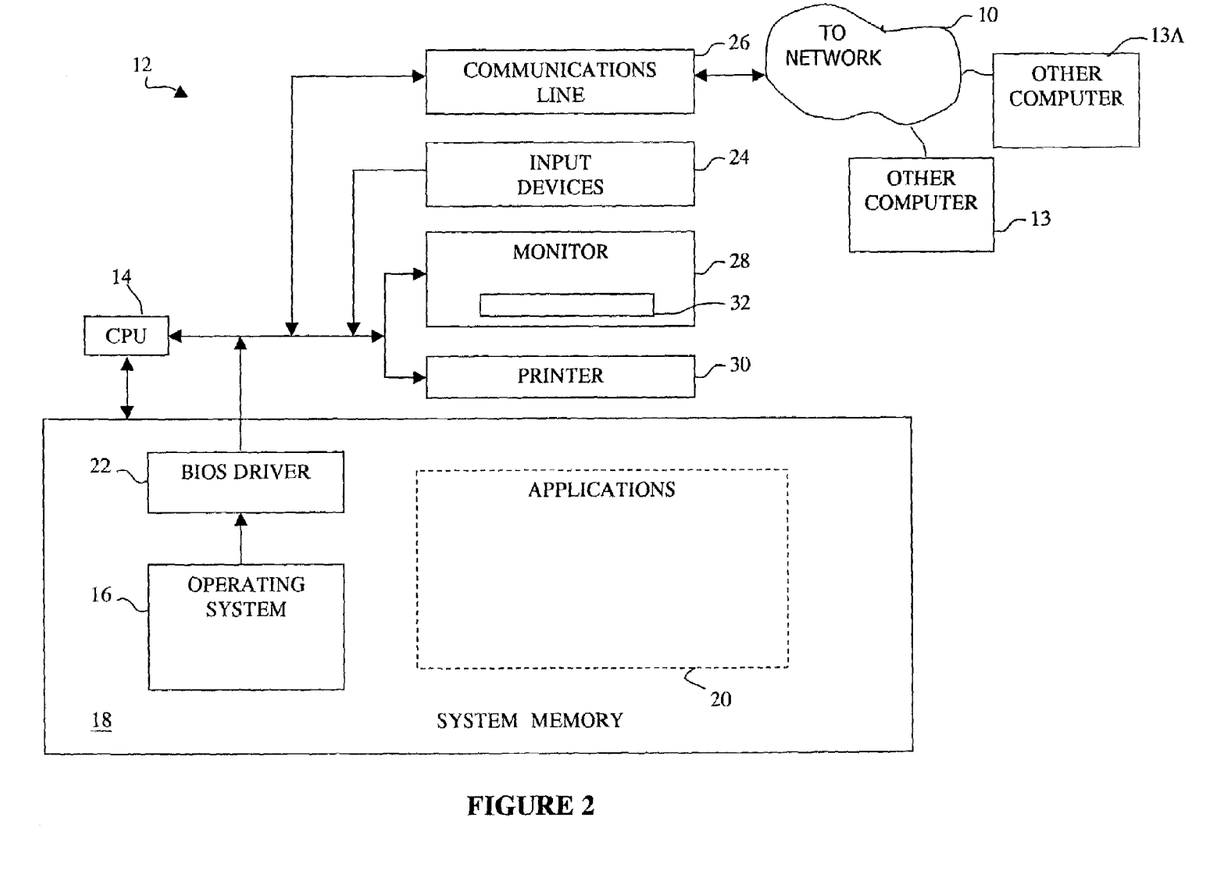
FIG. 2 shows the components of a general purpose computer system connected to an electronic network, which may be used in one embodiment to provide the system and method of the present invention.

With reference to the accompanying drawings, a detailed description of the present invention will be provided. FIG. 2 is a block diagram showing the components of a general purpose computer system 12 connected to an electronic network 10, such as a computer network. The computer network 10 can also be a public network, such as the Internet or Metropolitan Area Network (MAN), or other private network, such as a corporate Local Area Network (LAN) or Wide Area Network (WAN), or a virtual private network (VPN). As shown in FIG. 2, the computer system 12 includes a central processing unit (CPU) 14 connected to a system memory 18. The system memory 18 typically contains an operating system 16, a BIOS (basic input/output system) driver 22, and application programs 20. In addition, the computer system 12 contains input devices 24 such as a mouse and a keyboard 32, and output devices such as a printer 30 and a display monitor 28.

The computer system generally includes a communications interface 26, such as an Ethernet card, to communicate to the electronic network 10. Other computer systems 13 and 13A may also be connected to the electronic network 10. One skilled in the art would recognize that the above system describes the typical components of a computer system connected to an electronic network. It should be appreciated that many other similar configurations are within the abilities of one skilled in the art and all of these configurations could be used with the methods of the present invention.

In addition, one skilled in the art would recognize that the "computer" implemented invention described further herein may include components that are not computers per se but include devices such as Internet appliances and Programmable Logic Controllers (PLCs) that may be used to provide one or more of the functionalities discussed herein. Furthermore, "electronic" networks are generically used to refer to the communications network connecting the processing sites of the present invention, including implementation by electrical, optical or other equivalent technologies.

One skilled in the art would recognize that other system configurations and data structures and electronic/data signals could be provided to implement the functionality of the present invention. All such configurations and data structures are considered to be within the scope of the present invention.

Currently, eXtensible MarkUp Language (XML) models for creation of EDI documents are created using a software tool. This procedure requires a significant user effort for mapping purposes, as well as significant user effort to deal with any changes in document or message format of any trading partner that sends or receives EDI documents through the system.

Once the XML model is created, the user needs to tediously map the data from one side to the other. A map component file to configure the environment, a run file to invoke the translation and an input file to test the translation also have to be manually created. Creating these other environment components and adding mapping rules to the XML and EDI data models requires considerable user time and effort.

There is also a way to create an XML dialect (e.g., XEDI from XML Solutions, or the Chemical e-Standard from CIDX, or xCBL from CommerceOne). That solution aligns to EDI transaction sets such that the user can map information to and from an EDI format and an XML format. However, this solution places a heavier burden on the EDI mappers and integrators (users) since the solution provides a general Document Type Definition (DTD) as opposed to a specific one for each transaction type. Furthermore, it does not provide a translation for all possible transaction types for each of the EDI message standards.

Therefore, there is a need for a product that translates data from one companies' EDI format to another companies' EDI format, to allow for document or message exchange having differing formats and to easily accommodate changes in those formats.

One skilled in the art would recognize that XML is a set of rules and guidelines for designing text formats for data in a way that produces files that are more easily read by computers as well as humans. XML makes use of tags or metadata only to delimit data and leaves the interpretation of the data completely to the application that reads it. It is a simplified subset of the Standard Generalized Markup Language (SGML) which provides a file format for representing data, a schema for describing data structures, and a mechanism for extending and annotating Hyper Text Markup Language (HTML) with semantic information.

XML is important because it removes two constraints. First, it removes the dependence on a single, inflexible document type HTML. Secondly, it removes the complexity of full SGML, whose syntax allows many powerful but hard-to-program options. XML simplifies the levels of optionality in SGML and allows the development of user-defined document types on the web.

The basic unit of information in an EDI message is a data element. An example of an EDI message is an invoice or purchase order. Each item in the EDI invoice is representative of a data element. Each data element may represent a singular fact, such as a price, product, model number, and so forth. A string of data elements can be grouped together, and is called a data segment. There are several data segments per message, each having its own use. Each data segment is used for defining a specific item. In addition, an EDI message generally includes addressing information specific to a trading partner.

Metadata is data that describes data, and is used for XML messages and other types of EDI messages. Each data element is represented by its own metadata, which defines what the data corresponds to for each particular data element.

One skilled in the art would recognize that XML metadata can be developed by various different bodies for different reasons. For example, an international standard body may develop standardized sets of interchangeable data, an industry association may develop agreed procedures for interchanging messages between their members, a member of a multilateral agreement may need to share information, a company may need to supply information to their suppliers or customers, or a company may desire to obtain information in a known format from their suppliers or customers.

Figure 3:
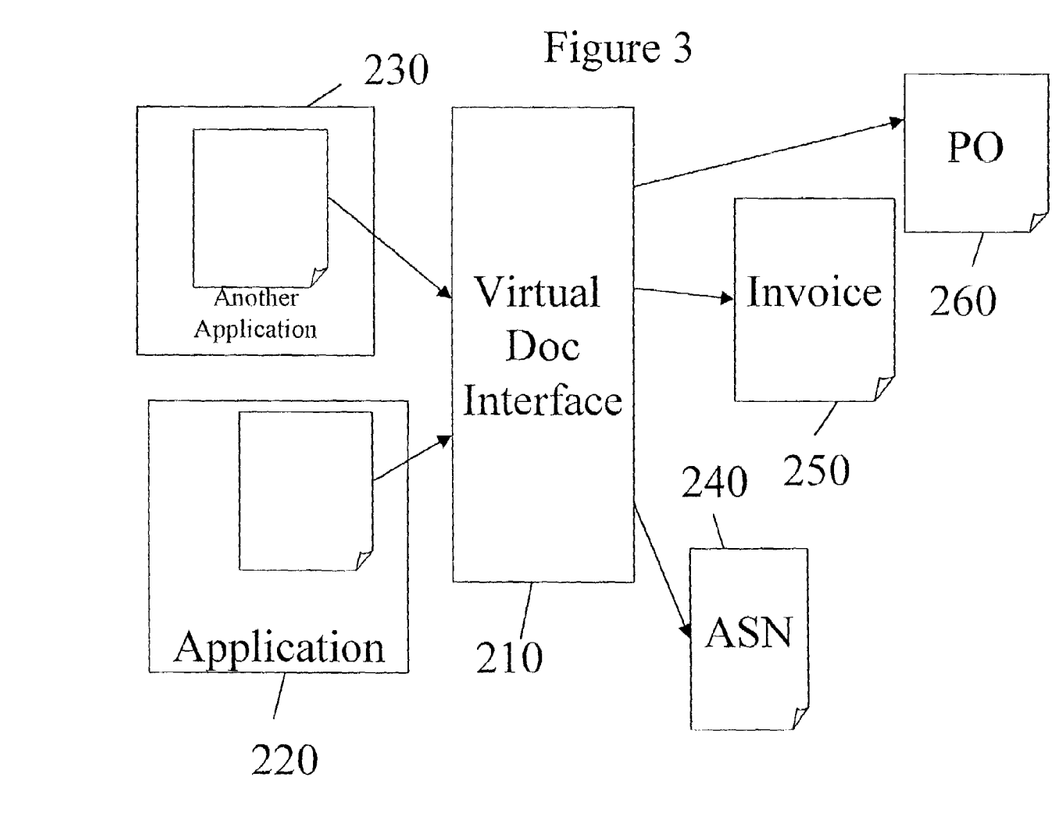
FIG. 3 is a high-level block diagram of a virtual document interface provided in an EDI system according to one embodiment of the present invention.

FIG. 3 is a high level block diagram of one embodiment of the present invention, in which a virtual document is provided in a virtual document interface 210 between applications 220, 230 and various types of messages or documents 240, 250, 260. Each application has a single link to the virtual document interface 210, in which previously-defined mappings to variables of the virtual document of the virtual document interface 210 are utilized in order to populate a target document or message from a source document or message. For example, application 220 may be one utilized to create an ANSI X12 Invoice document from an UN EDIFACT Purchase Order document that has been received by the EDI system, and application 230 may be an application to create an UN EDIFACT ASN message from a Materials Master List document that has been received by the EDI system.

The system and method according to this embodiment of the present invention enables automatic translation of EDI data to or from a self-describing markup language format, such as XML or an XML dialect, by way of a virtual document. The EDI data may be in various EDI public standard message formats including, but not limited to, ANSI X12, UN EDIFACT, RosettaNet, TRADACOMS, and CIDX.

Figure 4:
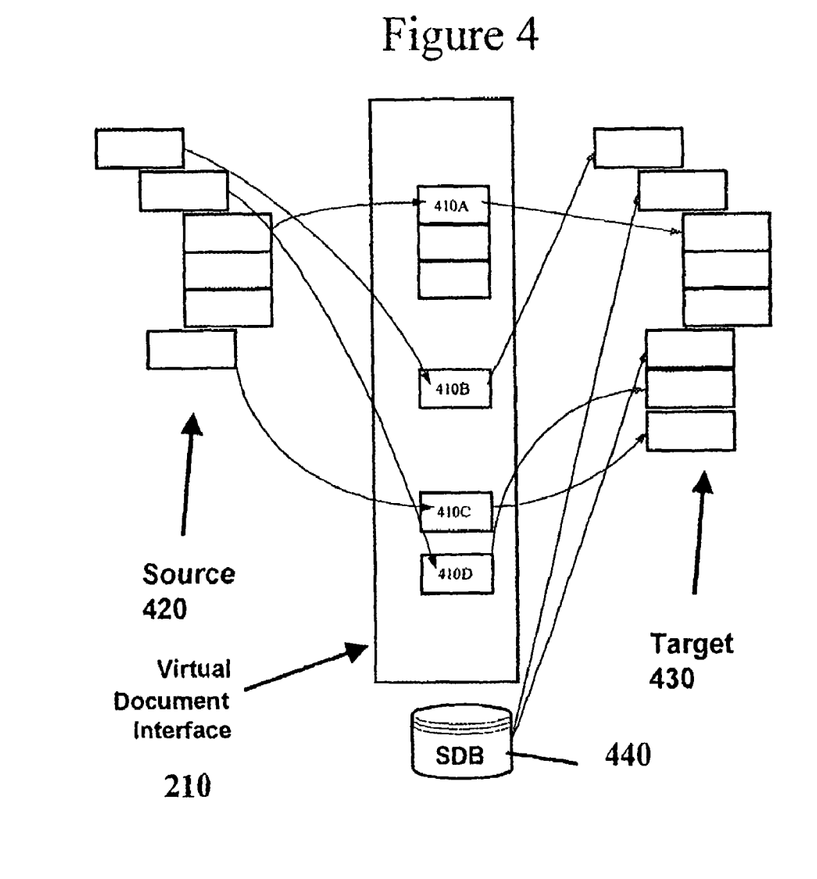
FIG. 4 shows a mapping between a source data model and a virtual document interface, and between the virtual document interface and a first target data model, according to one embodiment of the present invention.
Figure 8:
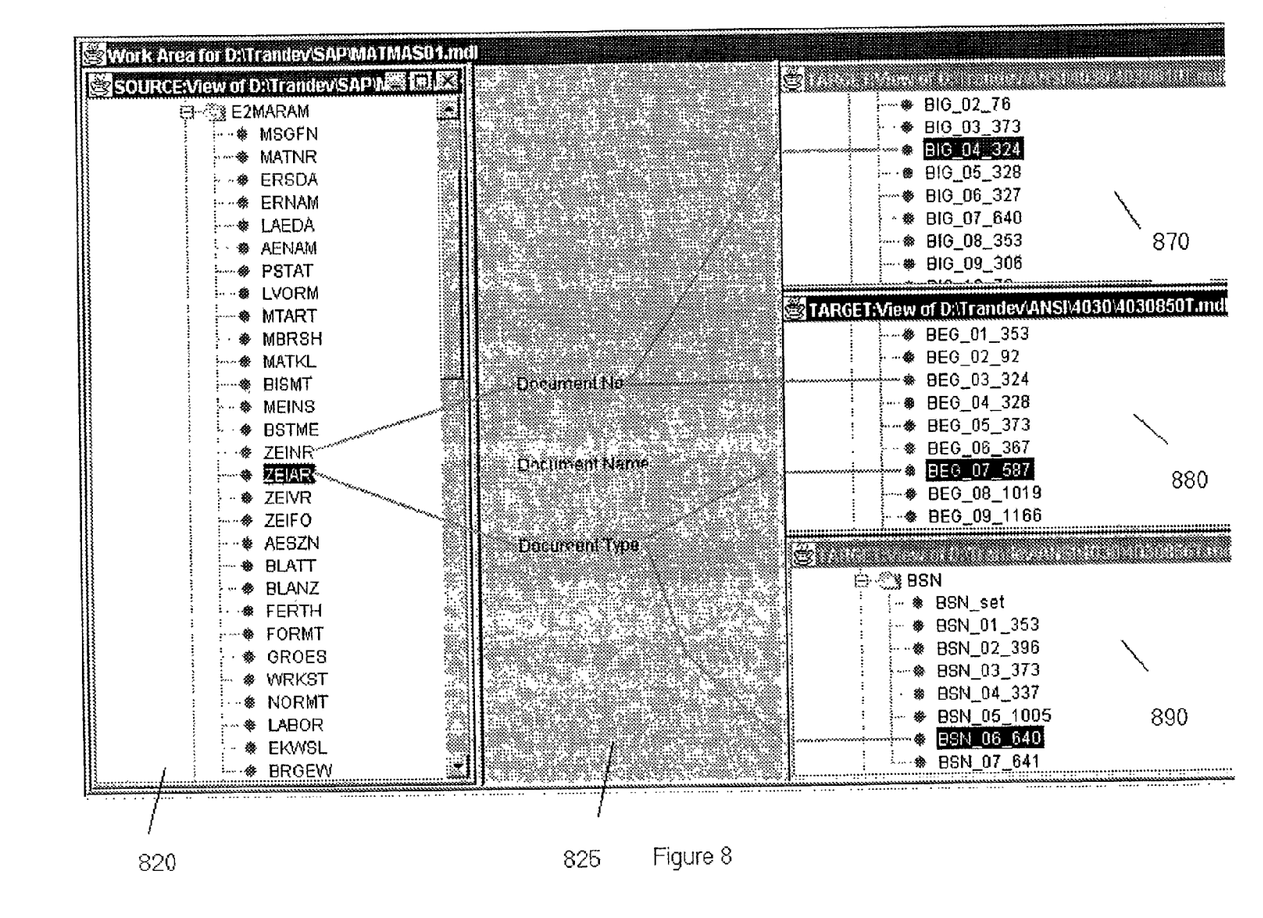
FIG. 8 shows links that have been provided between metadata elements of a source data model and variables of a virtual document, and links that have been provided between variables of the virtual document and metadata elements of three target data models, according to one embodiment of the present invention.

In the present invention, as shown in the example provided in FIG. 4, a virtual document interface 210 is utilized to map data from a source data model 420 to a target data model 430. The source data model 420 corresponds to a structure of a source document or a source message. The source data model 420 includes metadata and processing rules (the translator de-couples the metadata and the processing rules). For example, FIG. 8 shows a Materials Master List document (MATMAS) 820 that has been created in an enterprise resource planning system (such as one provided by SAP, Oracle or Peoplesoft), and which has been broken down into its constituent metadata elements. Each metadata element represents a particular data value in the source document, such as the document number or the document type, for example.

Referring back to FIG. 4, it shows the links or mappings to the variables 410A, 410B, 410C, 410D of a virtual document within the virtual document interface 210 according to the present invention, both to and from the source data model 420 and the target data model 430. By way of these links or mappings, data from a source document or message is transferred to a target document or message.

A state domain database 440 is also shown in FIG. 4, which provides data that is source-independent, and which is used to provide values for some of the metadata of the target data model 430. For example, if the target data model 430 is for Company X, then the name and address of Company X that is to be provided for particular portions of an invoice, for example, would be populated onto the invoice (as a target document or message) by way of data retrieved from the state domain database 440.

Figure 5:
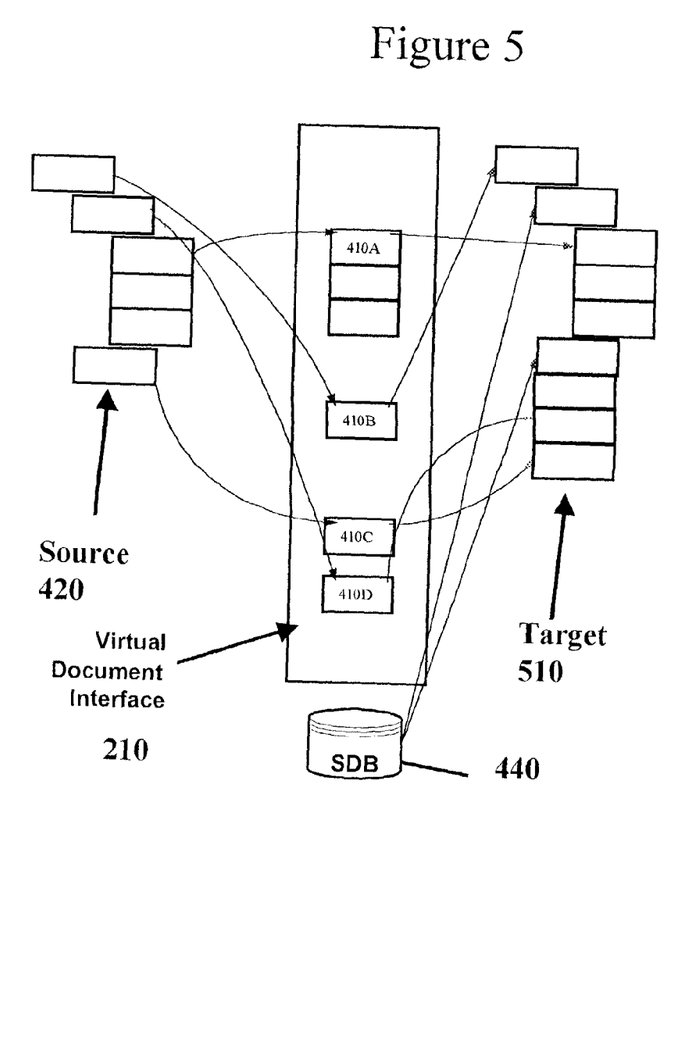
FIG. 5 shows a mapping between the source data model of FIG. 4 and a virtual document interface, and between the virtual document interface and a second target data model, according to one embodiment of the present invention.

FIG. 5 shows another mapping from the same source data model 420 to a second target data model 510, by way of the virtual document interface 210. The virtual document used within the virtual document interface 210 has the same variables as the one shown in FIG. 4, but the mappings to the second target data model 510 are different.

In the present invention, mapping from the source data model to the virtual document is achieved by the assignment of variables in the virtual document to the metadata of the source data model. For example, as shown in FIG. 8, the metadata element "ZEINR" is mapped to the variable "Document No." of the virtual document 825, and the metadata element "ZEIAR" is mapped to the variable "Document Type" of the virtual document 825.

In a preferred implementation, the mapping of the source data model to the variables of the virtual document should be done by someone familiar with the metadata of the source data model, such as someone familiar with SAP-formatted documents for the example shown in FIG. 8. That person, preferably an EDI mapper of the company that output the source document or message, is provided beforehand (from the EDI system) with a list of variables of the virtual document that is an important part of the EDI system of the present invention. The variables are preferably assigned semantic names to allow an easy understanding of what each variable represents (e.g., "Document No." corresponds to a number of a document, "Document Type" corresponds to a type of the document, etc.).

Once the mappings have been made by the EDI mapper (preferably), they are provided to an administrator of the EDI system of the present invention, to thereby allow documents or messages from the source to be mapped into different formats of one or more target data models of trading partners also using the EDI system. A similar procedure is done for providing mappings from the virtual document to other documents of trading partners (sources and/or targets) that are using the EDI system. For example, a large company can be considered as a "hub" of an EDI system in a hub-and-spoke arrangement, whereby the "spokes" correspond to the suppliers and/or customers (trading partners) of the hub company. The hub and spokes send and receive documents and messages to and from each other by way of the EDI system.

In the preferred implementation, as discussed above, semantic names are assigned to each of the variables in the virtual document, so that the virtual document mapper can readily equate a particular metadata element in an EDI document to a particular variable in the virtual document, in a document mapping process. Preferably, the semantic names provided for the variables of the virtual document are given by a non-technical, business-knowledgeable person to provide common business language terms for the variables. These common business language terms would be readily understandable by most businesspersons, regardless of what type of EDI documents their businesses may use. While only the variables "Document No.", "Document Name", and "Document Type" are shown in FIG. 8, other semantic names, such as "Company Name", "Company Address", etc., can be respectively assigned to other variables (not shown) of the virtual document.

Target documents are also mapped or linked to the variables of the virtual document. For example, as shown in FIG. 8, an ANSI X12Invoice document, designated as document 4030810T.mdl, is broken down into its constituent metadata elements, such as BIG_02_76, BIG_03$_{13}$ 373, etc. These names are defined by the ANSI X12 standard, and each has a particular meaning that is not readily apparent from the cryptic names assigned by the ANSI standards committee for their metadata elements. Typically, a large booklet has to be referred to in order to determine what data each of the metadata elements of the ANSI X12 document is supposed to represent.

Figure 9:
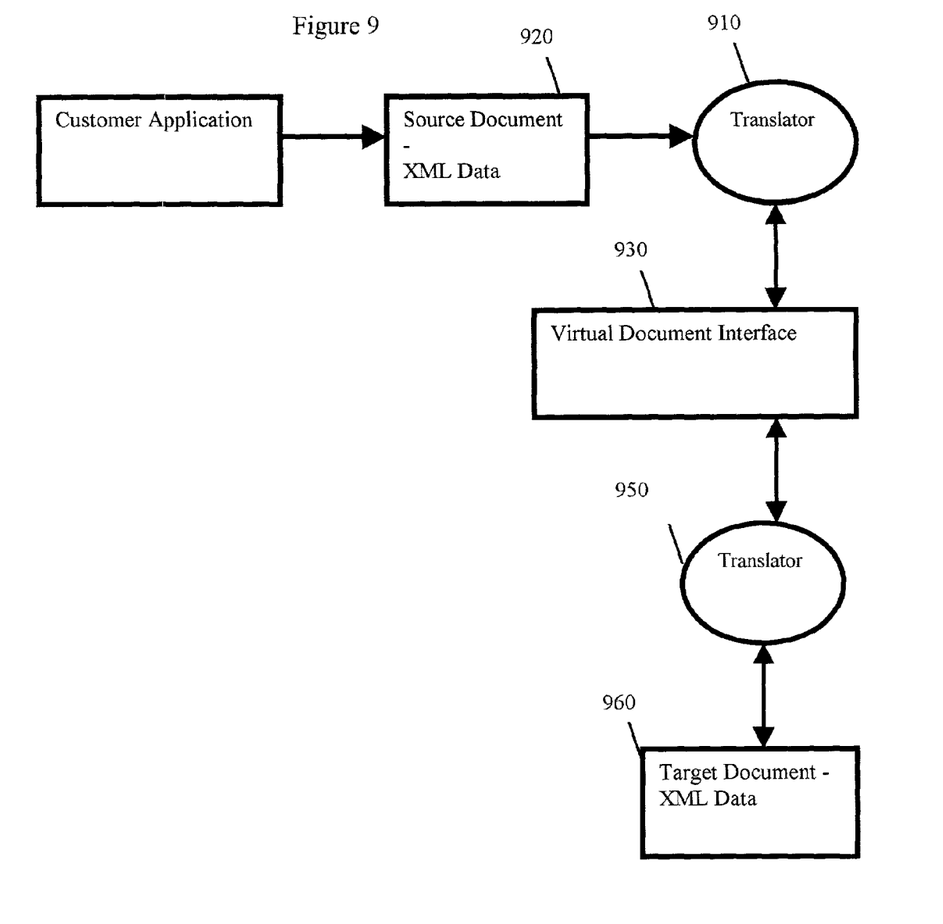
FIG. 9 shows a diagram of various elements of an EDI system that populate a target document or message from data obtained from a source document or message, according to one embodiment of the present invention.

In the present invention, the breaking down of source and target EDI documents or messages to their respective metadata elements and the transferring of the values in the metadata elements to the variables of the virtual documents is done at translation time by a translator. Referring now to FIG. 9, a translator 910 receives EDI documents or messages 920 (e.g., XML documents or XML messages) provided to the EDI system. By way of example and not by way of limitation, these documents may be provided by way of the Internet or by a WAN or LAN. The translator 910 determines where the document or message came from, as well as its type.

The translator 910 also extracts the various metadata elements from the received documents or messages. With the metadata elements extracted, the virtual document interface 930 is then utilized by the translator to transfer, based on associated mappings, source data of the source metadata elements to the individual variables of a virtual document within the virtual document interface 930. The virtual document interface 930 is also utilized by the translator 950 to map target metadata elements of a target document or message 960 to the individual variables of the virtual document. This effectively maps data values of one EDI format of a source document or message, to data values of a different EDI format of a target document or message. In the present invention, the translator 910 and the translator 950 may be the same translator, or they may be different translators.

In particular, one mapping is made from metadata of the source data model to intermediate variables of a virtual document, by way of links, whereby the variables of the virtual document are provided values from the source data model at run time. Another mapping is made from the intermediate variables of the virtual document to a target data model, by way of links, to provide values given to the variables of the virtual document to metadata of the target data model. The two mappings are brought together at run time to complete a mapping flow from a source document or message to a target document or message.

In the present invention, the source does not need to know anything about the structure and type of a target document that will respond to the source, and vice versa. That is because mappings or links have already been provided between the source document or message and the virtual document, and mappings or links have already been provided between the virtual document and the target document or message. As a result, changes in document structure or format can readily be handled by way of the present invention, by changing mappings to/from the virtual document for a particular type of document (source or target) that has its format or structure changed in some manner.

So, if a source changes its document invoice structure or format (e.g., from ANSI X12 to UN EDIFACT), one has only to provide to the EDI system a new mapping of the metadata elements of the new invoice structure with respect to the semantically-named variables of the virtual document of the EDI system. With the new mapping in place, data values from a source document or message having the new invoice structure will be properly pulled into the respective variables of the virtual document, and stored in memory. The populated variables are then retrieved from memory to provide values for metadata elements of a target document or message having a different (or the same) format (e.g., ROSETTANET).

In the present invention, for each type of XML (or other type) dialect to be input to the EDI system, such as ANSI X12, UN EDIFACT, RosettaNet, CIDX, etc., a purchase order would be assigned a different format or document structure based on the particular XML dialect used by a particular company as submitted to the EDI. The virtual document system operates to pull data from each of those different types of purchase order XML formats, into a single ANSI X12 format for an ASN document or ASN message, or to some other format (e.g., UN EDIFACT) of a trading partner. As shown in FIG. 8, for example, an ANSI X12 ASN message as a first target document 890 is transferred the information stored for the "Document Type"variable of the virtual document, with that stored information being provided to the BSN_06_640 metadata element. That information is used to populate the corresponding data field of the ANSI X12 ASN message of a trading partner (the target). The value corresponding to the "Document Type"variable of the virtual document is pulled by the translator from the ZEIAR metadata element of the Material Master List source document 820, as shown by the mappings to and from the virtual document 825 in FIG. 8.

Figure 10:
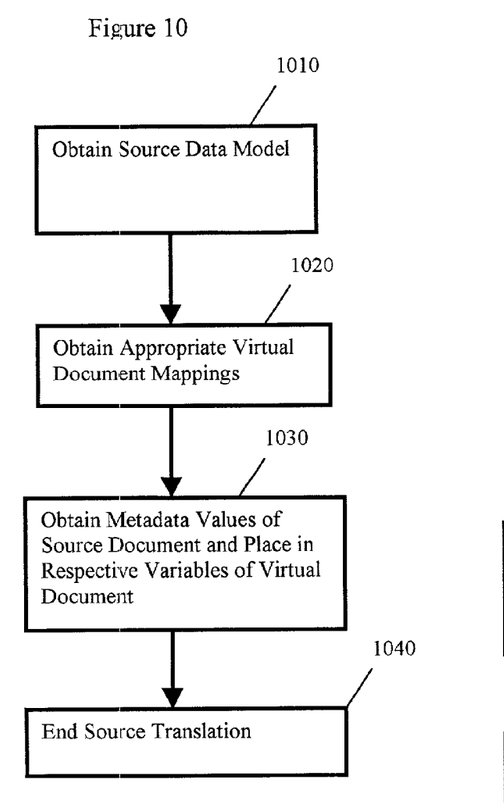
FIG. 10 shows steps performed by a translator with respect to a source document or message, according to one embodiment of the present invention.
Figure 11:
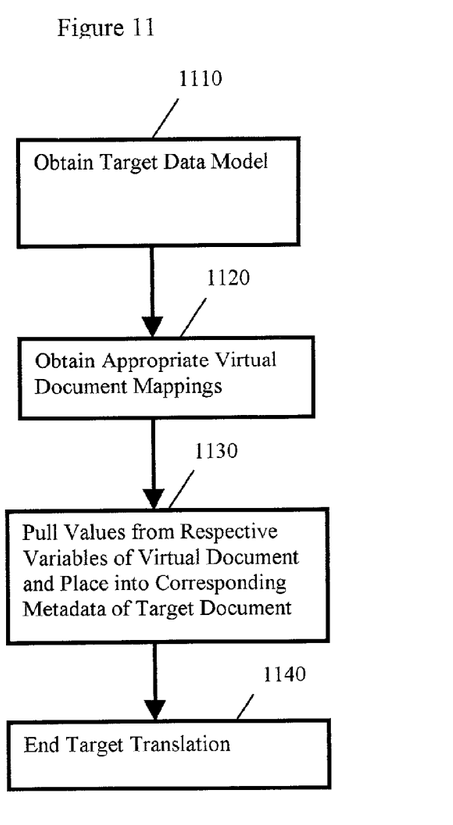
FIG. 11 shows steps performed by a translator with respect to a target document or message, according to one embodiment of the present invention.

Referring now to steps 1010 and 1110 in FIGS. 10 and 11, respectively, by way of a translator, which can be implemented as a computer programmed to perform document or message translation, as documents enter the EDI system, source and target data models are received, and de-coupled into their constituent metadata elements through the variables assigned to those documents or messages. The variables may be either in a VAR (one dimension) format or an ARRAY (multi-dimension) format.

Referring now to steps 1020 and 1120 in FIGS. 10 and 11, respectively, the correct mappings between the source and target data models with respect to the virtual document are obtained, based on the type of document or message corresponding to the source and target data models as well as the originator of the document or message.

Referring now to steps 1030 and 1130 in FIGS. 10 and 11, respectively, the values assigned to the metadata elements are then stored (for a source document or message, or read from a target document or message) in a memory at locations corresponding to the respective variables of the virtual document, to provide a transfer of pertinent information from a source document or message to a target document or message.

Referring now to steps 1040 and 1140 in FIGS. 10 and 11, respectively, upon completion of these steps, the translator completes the creation of an EDI document or message.

At run time, the translator parses the source document or message, such as the Materials Master List document 820 shown in FIG. 8, and then the virtual document is populated with values from the mapped metadata elements. For example, if ZEIAR metadata element of the Materials Master List document 820 has a value of "13336" assigned to it, then that value is written into the variable "Document No."of the virtual document. This writing of data may be made to a writable memory of the EDI system, such as a Random Access Memory or other type of writable memory device, as is known to those skilled in the art.

Under control of the translator, values are written into the variables of the virtual document from the source data model in a data stream from the source data model to the target data model, in accordance with the mappings or links to and from the variables of the virtual document. For example, the value 13336 corresponding to the document number (obtained from the source document or message and as written into the corresponding Document No. variable of the virtual document) is provided as a value for the metadata element BIG_04_324 of an ANSI X12 Invoice corresponding to a target document or message 870.

Multiple target documents or messages may be populated using data obtained from a single source document or message, using the virtual document system according to the present invention. FIG. 8 shows three target data models 870, 880, 890 (ANSI X12 ASN message, ANSI X12Invoice message, and ANSI X12 Purchase Order message) which are to be populated with data obtained from a single source document or message which may be of a different format (e.g., UN EDIFACT), by way of three different mappings from the variables of a virtual document 825. The mappings have been previously created during a virtual document mapping creation process.

As explained above, the metadata elements can represent messages or documents with a particular format, and the virtual document system can provide an interface for source or target messages or documents of differing formats.

In the present invention, at development time, mappings between different types of source and target documents or messages to variables of the virtual document are created, and those mappings are used to push and pull data between these documents or messages. During run time, the translator reads metadata and determines the type of document or message, such as whether it is an ANSI X12 of an UN EDIFACT document or message, and also the particular source or target of the document or message. Based on that determination, a mapping is obtained from a set of mappings previously created for the virtual document system, based on the type of document to be processed and the particular source or target associated with the document or message. That is, there may be one mapping for an ANSI X12 Purchase Order source document, and another mapping for an UN EDIFACT Invoice source document, and yet another mapping for a CIDX Purchase Order source document. Each of these mappings is used to populate the various variables in the virtual document with values from corresponding metadata elements of the source documents.

At run time, the values written into the variables of the virtual document are transferred to the corresponding metadata elements of a target document or message. For example, a user may run an application to create an ANSI X12 Invoice from a just-received Purchase Order source document in an UN EDIFACT format. An application message is created as a result, which obtains the appropriate virtual document mappings for a source document in a first EDI format and a target document in a second EDI format, which have been previously created in the system. With those mappings, values are written into corresponding variables of the virtual document, and those values are transferred into corresponding variables (or metadata) of the target document. As a result, a target document is populated, written, and returned to the sender.

Figure 6:
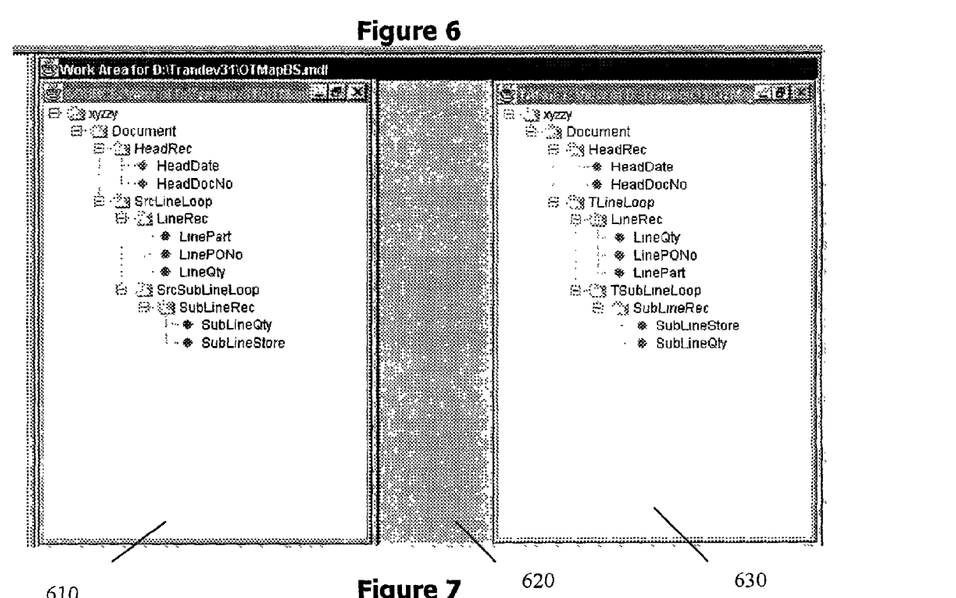
FIG. 6 shows a graphical user interface (GUI) of a source data model, a target data model, and a virtual document interface provided therebetween, according to one embodiment of the present invention.
Figure 7:
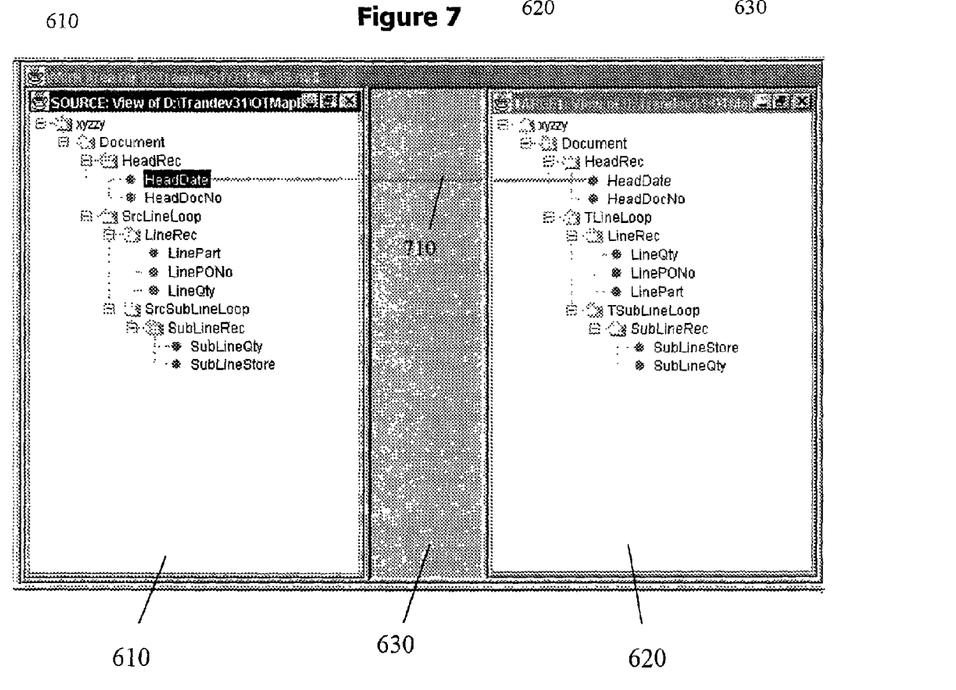
FIG. 7 shows a single link created between a source data model and a target data model, by way of a virtual document interface, according to a GUI that is applicable to one embodiment of the present invention.

FIG. 6 shows a source document 610 broken down into its constituent metadata, and a target document 620 broken down into its constituent metadata. FIG. 7 shows one mapping or link 710 that has been made by a user between the source document 610 and the virtual document 630, and between the virtual document 630 and the target document 620. This mapping may be made by a drag-and-drop implementation, for example, on a graphical user interface. That is, a user may click (by way of a computer mouse) on a metadata element of the source document or message 610 (e.g., HeadDate), to highlight it, and then hold down the previously-clicked mouse key to create a mapping to a variable (not shown, but see FIG. 8) of the virtual document 630. The user may also provide a mapping from a variable of the virtual document 630 to a metadata element of the target document or message 620, by manipulating a computer mouse in a similar manner. Other methods of providing links between documents and messages and the virtual document 630 may be envisioned by one skilled in the art, without departing from the teachings of the present invention.

By way of the mapping shown in FIG. 7, a data value associated with the metadata element "HeadDate" of the source document 610 is transferred to a variable (not shown) of the virtual document 630. The value provided to that variable of the virtual document 630 is then transferred to the metadata element "HeadDate" of the target document 620. When all of the data transfers have been made in accordance with all of the mappings or links provided with respect to variables of the virtual document 630, the populating of the target document 620 based on information obtained from the source document 610 is complete.

In one possible configuration, once the target document is populated with data from the source document, a user of the EDI system according to the present invention can access the document on a screen of a monitor or display. This allows the user to complete and/or modify the target document, prior to sending out the target document or message (back to the source, most likely). For example, if not all mappings were provided to the virtual document from the source document, then the user may have to fill in particular values of the target document or message manually.

The source and target documents 610, 620 shown in FIGS. 6 and 7 includes metadata with looping constructs. Looping constructs correspond to more than one variable of a source or target document or message being mapped to the same metadata element of that same document or message. For example, the metadata element called "LineRec" may have several values within the document or message associated with it.

The present invention provides for loop control to associate all of the values of a source or target document or message to one metadata element, and to write those values into a storage area of a memory to be associated with the one metadata element.

As an example, the elements LinePart, LineNo, and LineQty of the source document 610 in FIG. 6 are all associated with the metadata element LineRec, by way of a looping construct.

The values for the metadata elements are written into a memory region for a particular variable of a virtual document that is used to map the metadata element, which are provided to a particular metadata element of a target document or message. In other words, data model items mapped from a looping construct are grouped together with a single variable in the virtual document, and provided as a group of data to a target document by way of a linking from the single variable of the virtual document to a metadata element of a target document or message.

Mappings previously made for different types of document structures or formats are saved in the EDI system, and can be called up and used to make minor modifications, such as ones needed due to updated versions of documents or messages. For example, in FIG. 8, the first target document 870 is an ANSI X12 version 4030 Invoice named 4030810T, which may correspond to a version 4030 Invoice standard. When a new version, such as version 4040 ANSI X12 Invoice standard is published from a standards committee, then all one has to do is to retrieve the virtual document mapping for the version 4030, and then make the appropriate changes in mappings to accommodate the version 4040 document or message structure.

For example, the mappings may be saved as a project file on a computer system. That way, a user can access those mappings to create new mappings for new documents or messages to be processed by the EDI system. When the project file is opened, the existing mappings from a document to the variables of the virtual document are provided, and the user has only to modify those mappings based on the structure of the new document or message.

By way of the present invention, EDI documents or messages having differing formats are automatically processed by way of a virtual document interface. The virtual document interface provides a different mapping for each different type of EDI document or message, to the common semantic name variables of the virtual document. Since each document or message is mapped to the same list of variables of the virtual document, the transformation of data from one document to another document can readily be performed.

The number of variables of the virtual document can be very large (e.g., hundreds or more variables are possible). Based on the type of document or message, certain ones of the variables or the virtual document may be mapped to the document or message. Also, not all metadata of the document or message has to be mapped to the variables of the virtual document. In that case, the populating of a target document or message from a source document or message is done based on the virtual document mappings provided. In certain circumstances, a user may then have to complete entry of data into the document or message prior to sending it out.

Also, the variable names assigned to the virtual document may be changed by an EDI administrator in the EDI system according to the present invention, if deemed appropriate. For example, the variable name "Document No." may be changed to "Document Order No." That variable name change is provided to all companies using the EDI system, to allow them to make appropriate changes to their document mappings based on a semantic name change of a variable or variables of the virtual document.

A memory is utilized to store the values assigned to the variables of each different mapping for the virtual document. That way, if three source documents having the same structure and output from the same source come into the EDI system one after the other, the EDI system would store the corresponding values for the variables of the virtual document interface in different locations of memory, to be then retrieved to populate target documents associated with the respective three source documents. The method of assigning memory space to do this is conventional and known to those skilled in the art, and will not be described herein for the sake of brevity.

Various embodiments of the present invention provide many advantages over conventional EDI systems, such as one or more of the following:

1) the user can map a single message to multiple messages utilizing the virtual document (see FIG. 8, for example, which provides a one-to-three mapping);

2) the user can re-use single message maps for creating maps for new messages;

3) the user can diagnose errors in message maps;

4) the user can introduce new messages into the EDI system easily; and 5) multiple users can independently perform the same procedures by way of their own virtual document mappings, in a single EDI system that accommodates each of the multiple users.

Other embodiments of the invention will be apparent to those skilled in the art from a consideration of the specification and the practice of the invention disclosed herein. It is intended that the specification be considered as exemplary only, with the true scope and spirit of the invention being indicated by the following claims.

Also, besides the EDI formatting standards described above, the present invention is applicable to any EDI data transaction formatting standard (DTFS). By way of example and not be way of limitation, currently-used EDI data formatting standards include ANSI X12 (and subreleases VICS, UCS, and RAIL), TRADACOMS, UN EDIFACT, RosettaNet, xCBL, CIDX (Chemical Industry Data Standard), CII/EIAJ (Electronic Industry Association of Japan). EAI (Enterprise Application Integration) can be used to read EDI formats of any type of standard.

What is claimed is:

1. A computer implemented method of automatically generating Electronic Data Interchange (EDI) documents or messages using an EDI system, comprising:
   storing a plurality of maps for respectively mapping metadata from different types of source documents to variables of a virtual document;
   receiving a source data model having a first EDI format corresponding to EDI related data, the source data model including metadata;
   determining a type of the source data model from the metadata;
   obtaining a first map from the plurality of maps based on the determined type of the source data model, and mapping the metadata of the source data model to corresponding variables of a virtual document in accordance with the first map;
   determining a type of a target data model to which data from the source data model is to be transferred to;
   obtaining a second map from the plurality of maps based on the determined type of the target data model, and mapping the variables of the virtual document to metadata of a target data model having a second EDI format in accordance with the second map.

2. The method according to claim 1, wherein, when a source message or document is inputted to the EDI system, the source message or document is translated to obtain its corresponding metadata, and the values corresponding to the metadata are provided to the corresponding mapped variables of the virtual document at run time, and
   wherein the corresponding values of the mapped variables of the virtual document are provided to the corresponding metadata of the target data model, so as to populate the target data model with data from the source data model.

3. The method according to claim 2, wherein the first EDI format is a data transaction formatting standard, and the second EDI format is a data transaction formatting standard.

4. The method according to claim 2, wherein the variables of the virtual document are assigned semantic names representative of a type of data to be stored to the variables, and
   wherein the maps are created by a user prior to receiving the source data model, based on an intuitive correspondence made by the user from a particular metadata name of one of the metadata of the source data model and a particular semantic name of one of the variables of the virtual document.

5. The method according to claim 1, further comprising:
   obtaining, from a database, source-independent data that is used to provide predetermined values for at least one of the metadata of the target data model.

6. A system for automatically generating data in a self-describing markup language format from EDI data, comprising:
   a storing unit that stores a plurality of maps for respectively mapping metadata from different types of source documents to variables of a virtual document;
   a receiving unit that receives a message or document from a first trading partner as EDI data;
   a determining unit that determines a type of the message or document received from the metadata and that determines a type of a target data model;
   a virtual document that obtains a first map from the plurality of maps stored in the storing unit based on the type of the message or document as determined by the determining unit, and that maps metadata from the message or document of the first trading partner to variables of the virtual document in accordance with the first map, and that obtains a second map from the plurality of maps stored in the storing unit based on the type of the target data model as determined by the determining unit, and that maps metadata from a message or document of a second trading partner to the variables of the virtual document in accordance with the second map; and
   a transmitting unit that transmits values provided to the variables of the virtual document from the message or document from the first trading partner, to the corresponding metadata of the message or document of the second trading partner.

7. The system according to claim 6, wherein self-describing markup language format is XML.

8. The system according to claim 6, wherein the variables of the virtual document are assigned semantic names representative of a type of data to be stored to the variables, and
   wherein the maps are created by a user prior to receiving the message or document from the first trading partner, based on an intuitive correspondence made by the user from a particular metadata name of one of the metadata of the message or document received from the first trading partner and a particular semantic name of one of the variables of the virtual document.

9. The system according to claim 6, further comprising:
   a database that is communicatively connected to the virtual document, the database storing source-independent data that is used by the virtual document to provide predetermined values for at least one of the metadata of the target data model.

10. A computer readable data storage medium for an EDI system having program code recorded thereon that is executable by a computer to perform the following steps:
    storing a plurality of maps for respectively mapping metadata from different types of source documents to variables of a virtual document;
    receiving a source data model having a first EDI format corresponding to EDI related data, the source data model including metadata;
    determining a type of the source data model from the metadata;
    obtaining a first map from the plurality of maps based on the determined type of the source data model, and mapping the metadata of the source data model to corresponding variables of a virtual document in accordance with the first map;
    determining a type of a target data model to which data from the source data model is to be transferred to;
    obtaining a second map from the plurality of maps based on the determined type of the target data model, and mapping the variables of the virtual document to metadata of a target data model in accordance with the second map,
    wherein, when a source message or document is received by the EDI system, the program code is programmed to:
      translate the source message or document to obtain its corresponding metadata;
      provide the values corresponding to the metadata to the corresponding mapped variables of the virtual document; and provide the corresponding values of the mapped variables of the virtual document to the corresponding metadata of the target data model.

11. The computer readable data storage medium according to claim 10, wherein the EDI-related data is in a self-describing markup language format.

12. The computer readable data storage medium according to claim 11, wherein the self-describing markup language format is XML.

13. The computer readable data storage medium according to claim 10, wherein the variables of the virtual document are assigned semantic names representative of a type of data to be stored to the variables, and wherein the maps are created by a user prior to receiving the source data model, based on an intuitive correspondence made by the user from a particular metadata name of one of the metadata of the source data model and a particular semantic name of one of the variables of the virtual document.

14. The computer readable data storage medium according to claim 10, wherein the program code is further programmed to:

obtain, from a database, source-independent data that is used to provide predetermined values for at least one of the metadata of the target data model.

15. A system for automatically generating data in a self-describing markup language format from received EDI data, comprising:

storing means for storing a plurality of maps for respectively mapping metadata from different types of source documents to variables of a virtual document;

receiving means for receiving a message or document from a first trading partner as EDI data;

determining means for determining a type of the message or document received by the receiving means from the metadata, and for determining a type of a target data model;

a virtual document that obtains a first map from the plurality of maps stored in the storing means based on the type of the message or document received by the receiving means as determined by the determining means, and that maps metadata from the message or document of the first trading partner to variables of the virtual document in accordance with the first map, and that obtains a second map from the plurality of maps stored in the storing means based on the type of the target data model as determined by the determining means, and that maps metadata from a message or document of a second trading partner to the variables of the virtual document in accordance with the second map; and transmitting means for transmitting values provided to the variables of the virtual document from the message or document from the first trading partner, to the corresponding metadata of the message or document of the second trading partner.

16. The system according to claim 15, wherein self-describing markup language format is XML.

17. The system according to claim 15, wherein the variables of the virtual document are assigned semantic names representative of a type of data to be stored to the variables, and wherein the maps are created by a user prior to receiving the source data model, based on an intuitive correspondence made by the user from a particular metadata name of one of the metadata of the message or document received by the receiving means and a particular semantic name of one of the variables of the virtual document.

18. The system according to claim 15, further comprising:

a database that is communicatively connected to the virtual document, the database storing source-independent data that is used by the virtual document to provide predetermined values for at least one of the metadata of the target data model.

19. A method for automatically generating data in a prescribed format from a received EDI document or message having metadata elements, comprising:

assigning, by a first user, a first plurality of maps from metadata elements of different types of source documents to variables of a virtual document;

assigning, by a second user, a second plurality of maps from the variables of the virtual document to metadata elements of a target EDI document or message;

pulling values assigned to the metadata elements of the received EDI document or message to the variables of the virtual document, based on a source document-to-virtual document mapping that corresponds to one of the first plurality of maps that is automatically determined based on a type of the metadata elements of the received EDI document or message; and pushing values assigned to the variables of the virtual document to metadata elements of the target EDI document or message, based on a target document-to-virtual document mapping that corresponds to one of the second plurality of maps that is automatically determined based on a type of the metadata elements of the target EDI document or message.

20. The method according to claim 19, wherein at least one of the values pulled to the variables of the virtual document is obtained from source-independent information obtained from a database.

* * * * *